United States Patent
Bleile et al.

(10) Patent No.: US 9,874,171 B2
(45) Date of Patent: Jan. 23, 2018

(54) METHOD AND DEVICE FOR CONTROLLING AN INTERNAL COMBUSTION ENGINE

(75) Inventors: Thomas Bleile, Stuttgart (DE); Wilhelm Blumendeller, Freiberg (DE); Daniel Kuhn, Pliezhausen-Ruebgarten (DE); Julian Reichel, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 1702 days.

(21) Appl. No.: 13/300,777

(22) Filed: Nov. 21, 2011

(65) Prior Publication Data
US 2012/0130618 A1 May 24, 2012

(30) Foreign Application Priority Data

Nov. 19, 2010 (DE) .......................... 10 2010 044 164

(51) Int. Cl.
| | | |
|---|---|---|
| F02B 47/08 | (2006.01) | |
| F02D 41/22 | (2006.01) | |
| F02D 41/14 | (2006.01) | |
| F02D 41/18 | (2006.01) | |
| F02D 41/00 | (2006.01) | |

(52) U.S. Cl.
CPC ....... *F02D 41/222* (2013.01); *F02D 41/1448* (2013.01); *F02D 41/18* (2013.01); *F02D 41/0007* (2013.01); *F02D 41/0072* (2013.01); *F02D 2200/0406* (2013.01); *Y02T 10/40* (2013.01)

(58) Field of Classification Search
USPC ....... 701/102; 60/605.2, 295, 286, 297, 611; 123/568.21, 568.12, 198 F
See application file for complete search history.

(56) References Cited

U.S. PATENT DOCUMENTS

| | | | | |
|---|---|---|---|---|
| 5,623,905 A | * | 4/1997 | Kau et al. | ...................... 123/361 |
| 6,910,458 B2 | * | 6/2005 | Oki | ........................... 123/198 F |
| 7,721,539 B2 | * | 5/2010 | Reynolds et al. | .............. 60/601 |
| 2011/0088674 A1 | * | 4/2011 | Shutty et al. | ............ 123/568.21 |
| 2012/0023937 A1 | * | 2/2012 | Styles et al. | ................. 60/605.2 |
| 2013/0305715 A1 | * | 11/2013 | Rollinger et al. | ........... 60/605.2 |
| 2013/0305716 A1 | * | 11/2013 | Rollinger et al. | ........... 60/605.2 |
| 2014/0020656 A1 | * | 1/2014 | Kosaka et al. | ................ 123/348 |

FOREIGN PATENT DOCUMENTS

| | | |
|---|---|---|
| CN | 1490509 | 4/2004 |
| CN | 1688801 | 10/2005 |
| CN | 101435377 | 5/2009 |
| DE | 102010002849 | 9/2011 |

* cited by examiner

*Primary Examiner* — Hai Huynh
*Assistant Examiner* — Gonzalo Laguarda
(74) *Attorney, Agent, or Firm* — Michael Best & Friedrich LLP (57) ABSTRACT

A method for diagnosing a malfunction of a sensor system in an air system of an internal combustion engine, said sensor system comprising a first air state sensor, a second air state sensor and a third air state sensor, wherein a first value and a second value of a first comparison variable are ascertained in two different ways in an overall calculation step such that the result of a comparison between the first value and the second value is a function of each of the output variables of the first, second and third air state sensors and wherein in a fault detection step, said method recognizes as a function of the comparison between said first value and said second value of the comparison variable that a fault exists in the sensor system.

17 Claims, 10 Drawing Sheets

METHOD AND DEVICE FOR CONTROLLING AN INTERNAL COMBUSTION ENGINE

BACKGROUND OF THE INVENTION

Physical variables are acquired via sensors in an air system of an internal combustion engine and are used as input variables for calculating further modeled variables.

A method, for example, is known from the non-prepublished German patent publication DE 10 2010 002849 how air pressure upstream of a throttle valve can be calculated from an air mass flow which was ascertained. In the case of a diesel engine having a turbocharger, pressure in the exhaust gas tract can be calculated from the charge of the internal combustion engine, the quantity of fuel injected, the rotational speed of the turbocharger, a geometry factor of the turbocharger and the temperature in the exhaust gas tract.

Controllers as, for example, boost pressure or air mass controllers, are based on the aforementioned variables in order to ensure an optimal engine charge with regard to emissions, consumption etc. Error-prone sensors would therefore lead to an increase in harmful emissions and thus by law have to be diagnosed for malfunctions. In this case, it is required by law for the malfunction of an individual sensor to be reliably diagnosed. On the other hand, so-called double faults, i.e. the simultaneous malfunction of two or more sensors, do not have to be considered under the law. A diagnostic method can therefore proceed from the premise that maximally one sensor is defective.

Electrical diagnoses for waste cables, shorts to ground and power supply can, for example, be carried out. Furthermore, a plausibility check can be made of one sensor to a second sensor and if need be an offset compensation at a defined working point can be carried out. It is, for example, known from prior art how to check the plausibility of a boost pressure sensor and an exhaust gas back pressure sensor with an ambient pressure sensor when the engine is switched off. The working point thereby defined is, however, only one possible operating point of the sensor and in no way covers the full operating range. In addition, it is possible to check the plausibility of an air mass flow meter with the boost pressure sensor. No specific "pinpointing" can, however, occur using this procedural approach. That is to say it cannot be concluded whether the boost pressure sensor or the air mass flow meter is defective.

A diagnosis does not exist for the exhaust gas back pressure sensor over the full operating range of said exhaust gas back pressure sensor.

SUMMARY OF THE INVENTION

In contrast, the method according to the invention performs a complete diagnosis of the exhaust gas back pressure sensor. The exhaust gas back pressure sensor is in this case, for instance, integrated with the air mass flow meter and the boost pressure sensor into one sensor system which is diagnosed. In place of the exhaust gas back pressure sensor, the air mass flow meter and the boost pressure sensor, any other sensor system consisting of a first, a second and a third air state sensor of an air system of an internal combustion engine can, however, also be diagnosed.

To accomplish this end, it is initially determined whether the sensor system is in good working order. This is achieved by virtue of a test being initially performed to determine whether all sensors of the sensor system deliver plausible values among one another. Using pair by pair comparisons of variables, which are dependent on only two of the three sensors of the sensor system, sensors are then checked in pairs for plausibility among one another. If the values are plausible but a fault exists in the overall system, a conclusion is thereupon drawn according to the invention that a fault exists in the remaining sensor.

In order to determine whether such a sensor system, which comprises a first air state sensor, a second air state sensor and a third air state sensor is in good working order, a first value and a second value of a first comparison variable characterizing a state of the air system are ascertained in two different ways, and these two values are subsequently compared with one another. It is important here that the result of the comparison between the first value and the second value is a function of each of the output variables of the first, second and third air state sensors. If the method recognizes as a function of the comparison of the first value with the second value of the first comparison variable, which characterizes the state of the air system, that a fault exists in the sensor system, a diagnostic procedure to check for the good working order of all three sensors is then made available.

The method according to the invention thus recognizes if there is any fault at all in the sensor system. Should said method recognize that a fault is present, a further characterization of the fault can be conducted in additional steps. It can thus be determined in these additional steps, in which sensor or sensors the fault is present.

The first comparison variable which characterizes the state of the air system can, for example, be stated in terms of a mass flow across an exhaust gas recirculation valve or by an exhaust gas back pressure.

If a third value and a fourth value of a second comparison variable characterizing the state of the air system are ascertained in a further step in two different ways, these ascertainments being such that the result of a comparison between the third value and the fourth value is a function of the output variable of the first air state sensor and the second air state sensor and independent of the third air state sensor and if it is then subsequently suggested on the basis of the comparison of the third value and the fourth value of the second comparison variable characterizing the state of the air system that the third air state sensor is defective, this has the advantage that a malfunction of the third sensor can be identified in a targeted manner.

If in the process a first means controlling a first air flow is actuated to close in a separation step and as a result the air system divides into a first region, in which two or three air state sensors lie, and a second region, in which the remaining air state sensor of the three lies, so that the result of the comparison between the third value and the fourth value is independent of the output variable of the third air state sensor, the dependence of the comparison between the third value and the fourth value on the output variables of the first and the second air state sensor and the independence of said comparison from the output variable of the third air state sensor thus ensue in an especially simple manner.

If this second comparison variable characterizing the state of the air system is stated in terms of a mass flow across an exhaust gas recirculation valve or an exhaust gas back pressure or an air charge per unit of time to the combustion chambers of the internal combustion engine, the dependence on the output variables of the first and second air state sensors and the independence from the output variable of the third air state sensor can be very simply achieved.

If a fifth value and a sixth value of a third comparison variable characterizing the state of the air system are additionally ascertained in two different ways such that the result of a comparison between the fifth value and the sixth value is a function of the output variables of the second air state sensor and the third air state sensor and independent of the output variable of the first air state sensor and if based on the comparison between the fifth value and the sixth value of the third comparison variable characterizing the state of the air system, it is suggested that the first air state sensor is defective, a so-called "pin-pointing", i.e. a specific associating of a malfunction of the sensor system with a malfunction of an individual sensor, is then ensured.

If in this case a second means controlling a second air flow is actuated to close and therefore divides the air system into a third region, in which two or three air state sensors lie, and a fourth region, in which the remaining air state sensor of the three lies, so that the result of the comparison between the fifth and the sixth value is independent of the output variable of the second air state sensor, the dependence on the output variables of the second and third air state sensors and the independence from the output variable of the first air state sensor can then be very simply achieved.

If the third comparison variable characterizing the state of the air system is stated in terms of a mass flow across an exhaust gas recirculation valve or an exhaust gas back pressure or an air charge per unit of time to the combustion chambers of the internal combustion engine, the dependence on the output variables of the first and second air state sensors and the independence from the output variable of the third air state sensor can be very simply achieved.

BRIEF DESCRIPTION OF THE DRAWINGS

The figures show a particularly advantageous embodiment of the method according to the invention, in which.

DETAILED DESCRIPTION

Figure 1:
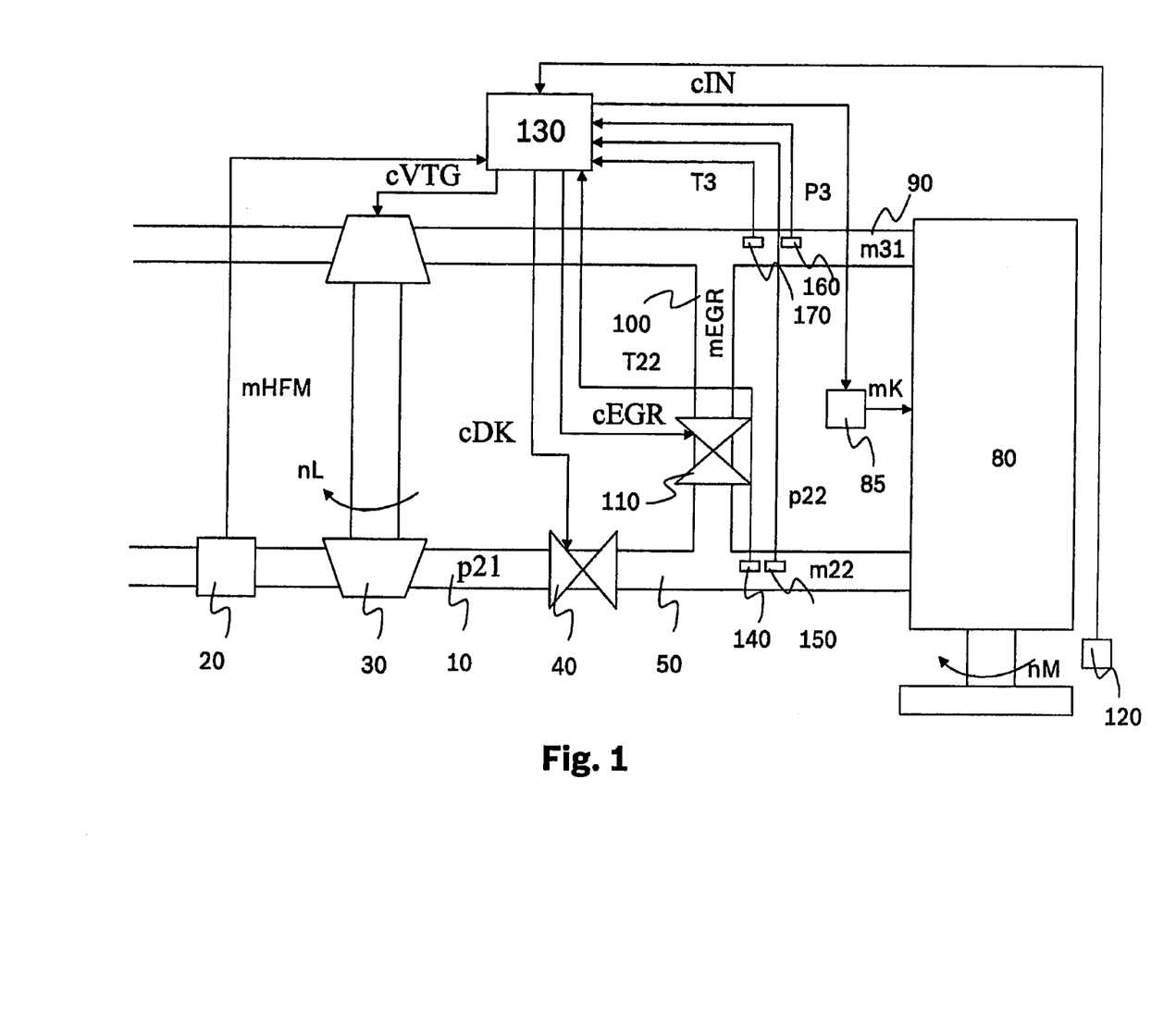
FIG. 1 shows schematically the air system of an internal combustion engine comprising an exhaust gas turbocharger.

FIG. 1 shows the air system of an internal combustion engine having an exhaust gas turbocharger. By way of an intake manifold 10, fresh air flows past an air mass flow meter 20, is compressed by an exhaust gas turbocharger 30 rotating with a revolutions per minute nL and flows across a throttle valve 40 into an intake tract 50. An air charge m22 flows per unit of time into combustion chambers 80. A fuel injection device 85 injects a fuel mass per unit of time mK into the combustion chambers 80. A crankshaft having a rotational speed nM is driven by the combustion process performed in the usual manner. An exhaust gas quantity m31 leaves said combustion chambers 80 per unit of time and flows into an exhaust tract 90. A portion of the exhaust gas quantity m31 flows across an exhaust gas recirculation line 100 back into the intake tract 50. A gas quantity recirculated per unit of time mEGR is determined by a degree of opening of an exhaust gas recirculation valve 110. The remainder of the exhaust gas quantity m31, which is not returned back into said intake tract, flows across a turbine blade of the exhaust gas turbocharger 30 and thus drives the same.

A control/regulating device 130 receives signals, for example, from sensors and sends signals, for example, to actuators. The air mass flow meter 20 detects an air quantity mHFM flowing per unit of time through the intake manifold 10 and sends a corresponding output signal to the control/regulating device 130.

The gas present in the intake tract 50 has a boost pressure p22 and an intake air temperature T22. An intake air temperature sensor 140 acquires the intake air temperature T22 and sends a corresponding output signal to the control/regulating device 130. A boost pressure sensor 150 acquires the boost pressure p22 and sends a corresponding output signal to said control/regulating device 130.

The gas in the exhaust tract 90 has a discharge temperature T3 and an exhaust gas back pressure p3. An exhaust gas back pressure sensor 160 acquires an exhaust gas back pressure p3 and sends a corresponding output signal to the control/regulating device 130. A discharge temperature sensor 170 acquires the discharge temperature T3 and sends a corresponding output signal to said control/regulating device 130. An engine rotational speed sensor 120 acquires the rotational speed nM of the crankshaft and sends a corresponding output signal to said control/regulating device 130.

The control/regulating device 130 sends a throttle valve actuation signal cDK to the throttle valve 40 and thus determines the degree of opening of said throttle valve 40 and therefore the flow rate of fresh gas through said throttle valve 40. Said control/regulating device 130 sends an exhaust gas recirculation valve actuation signal cEGR to the exhaust gas recirculation valve 110 and thus determines the opening cross section of said exhaust gas recirculation valve 110 and therefore the gas quantity recirculated per unit of time mEGR.

The control/regulating device 130 sends a fuel injection device actuation signal cIN to a fuel injection device 85 and thereby determines the fuel mass injected per unit of time mK. Said control/regulating device 130 sends an exhaust gas turbocharger actuation signal cVTG to the exhaust gas turbocharger 30 and thus determines a geometry of the turbine. The geometry of the turbine influences the rotational speed nL of said exhaust gas turbocharger.

Figure 2:
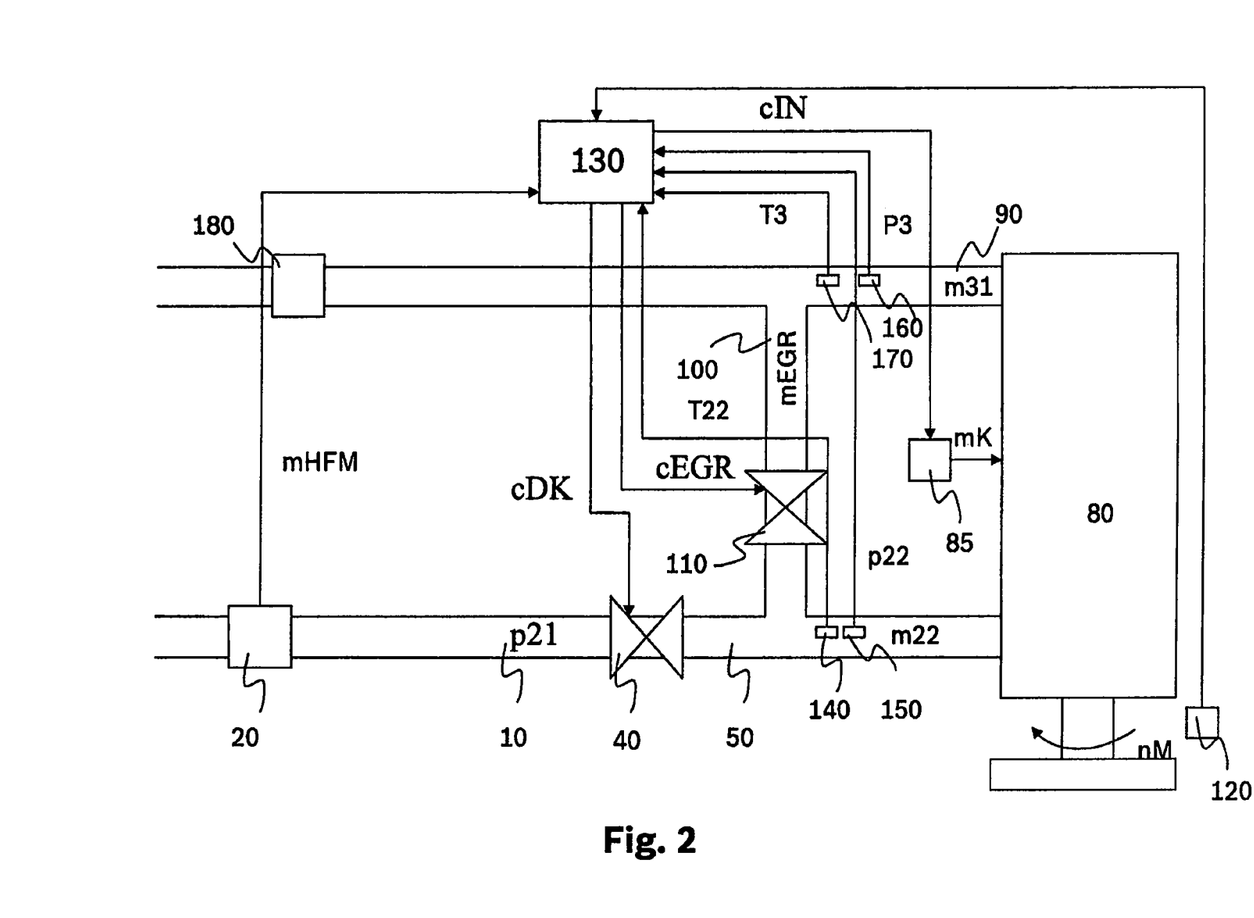
FIG. 2 shows schematically the air system of an internal combustion engine without an exhaust gas turbocharger.

FIG. 2 shows the configuration of an internal combustion engine without an exhaust gas turbocharger 30. The configuration is analogous to the internal combustion engine depicted in FIG. 1. In addition, a muffler 180, which controls the flow of the exhaust gas, is situated in the exhaust tract 90.

Figure 3:
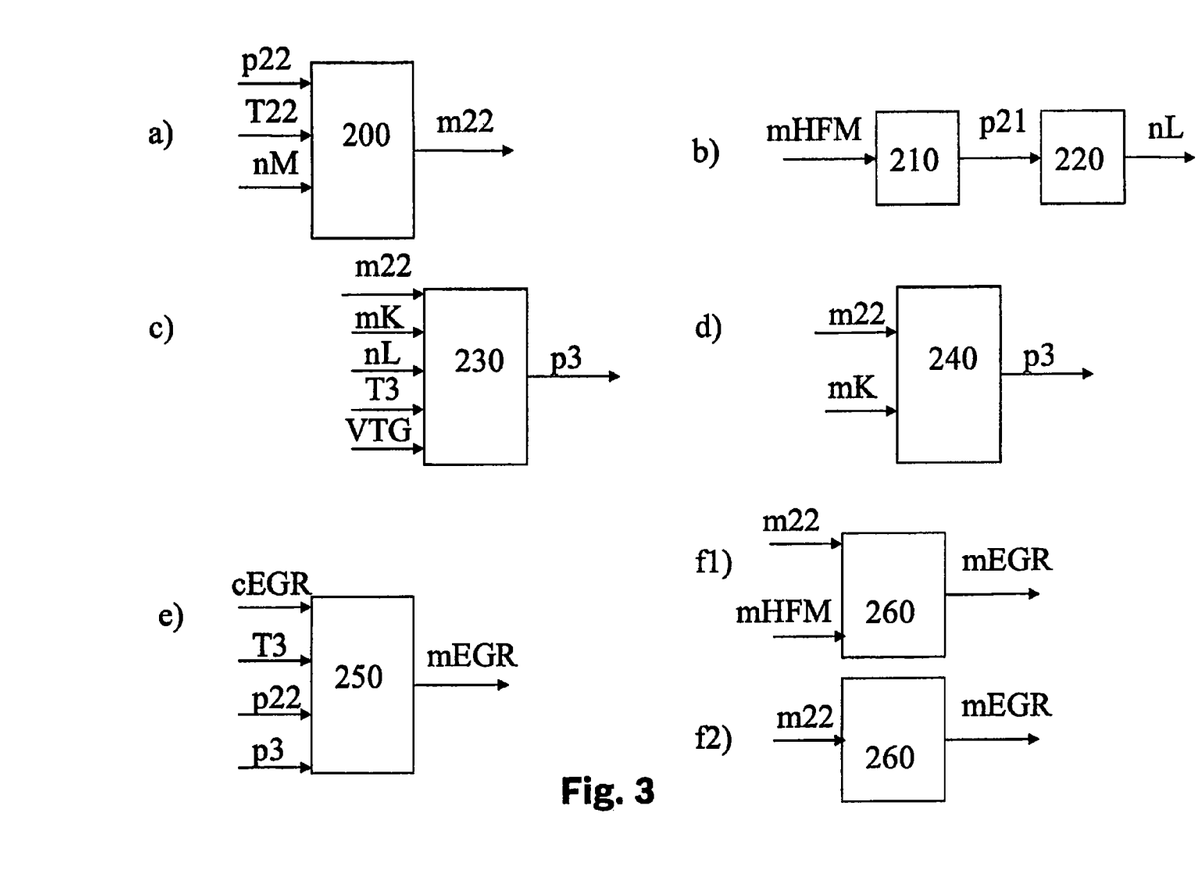
FIG. 3 shows computation blocks within a control/regulating device.

FIG. 3 shows several exemplary computation blocks, which enable the control/regulating device 130 to calculate further variables characterizing the state of the air system on the basis of the sensor signals received by and the actuation signals sent by said control/regulating device.

FIG. 3a shows an air charge ascertainment block 200. The air charge ascertainment block 200 calculates the air charge m22 flowing into the combustion chambers 80 per unit of time based on the boost pressure p22, the intake air temperature T22 and the rotational speed nM of the crankshaft. If the volume of the intake tract 50 is designated as V22, the gas constant of the gas mixture present in said intake tract 50 as R and a proportionality constant, which is a function of the injected fuel quantity mK and the rotational speed of the crankshaft nM, as IA, the relation ascertained from the air charge ascertainment block 200 ensues at:

$$m22 = IA \cdot \frac{p22 \cdot V22 \cdot nM}{2 \cdot R \cdot T22}$$

FIG. 3b shows an exhaust gas turbocharger rotational speed-ascertainment block 220 in combination with an intake manifold pressure-ascertainment block 210. The intake manifold pressure-ascertainment block 210 ascertains, for example, a gas pressure p21 prevailing in the intake manifold 10 between the exhaust gas turbocharger 30 and the throttle valve 40 from the quantity of fresh air mHFM flowing through said intake manifold 10 per unit of time in the manner described in the non-prepublished German patent publication DE 10 2010 002849. The exhaust gas turbocharger rotational speed-ascertainment block 220 ascertains the rotational speed of the exhaust gas turbocharger nL from the aforementioned gas pressure p21.

FIG. 3c shows an exhaust gas back pressure-calculation block 230 for the case depicted in FIG. 1 of an internal combustion engine comprising an exhaust gas turbocharger 30. In a manner known from prior art, the exhaust gas back pressure calculation block 230 ascertains the exhaust gas back pressure p3 from the air charge m22 per unit of time supplied to the combustion chambers 80 which was ascertained, for example, using the air charge-calculation block 200, from the fuel quantity injected per unit of time mK which was ascertained, for example, via a characteristic diagram from the fuel injection device actuation signal cIN, from the rotational speed nL of the exhaust gas turbocharger 30 ascertained, for example, via the intake manifold pressure-ascertainment block 210 and the rotational speed-ascertainment block 220, from the exhaust gas turbocharger actuation signal cCVT, from which a geometry factor of the turbocharger is determined, and from the discharge temperature T3.

FIG. 3d shows an exhaust gas back pressure-calculation block 240 for the case depicted in FIG. 2 of an internal combustion engine without an exhaust gas turbocharger 30. The exhaust gas back pressure p3 is determined in this case substantially from the exhaust gas quantity per unit of time m31. The exhaust gas quantity per unit of time m31 is determined as the sum of the air charge m22 flowing into the combustion chambers 80 per unit of time and the fuel quantity injected per unit of time mK. The exhaust gas back pressure calculation block 240 ascertains, for example, the exhaust gas back pressure p3 in this manner. The air charge m22 flowing into the combustion chambers 80 per unit of time is ascertained, for example, with the air charge calculation block 200 and the fuel quantity injected per unit of time mK, for example, via a characteristic diagram from the fuel injection device actuation signal cIN.

FIG. 3e shows an exhaust gas recirculation quantity-calculation block 250. The exhaust gas recirculation quantity-calculation block 250 ascertains the gas quantity mEGR returned through the exhaust gas recirculation line 100 from the exhaust gas recirculation valve actuation signal cEGR, from the discharge temperature T3, from the boost pressure p22 and from the exhaust gas back pressure p3. An opening cross section A of the exhaust gas recirculation valve 110 is ascertained, for example, via a characteristic diagram. The gas quantity recirculated per unit of time mEGR is then calculated as $$mEGR = \alpha \cdot A \cdot \sqrt{\frac{2}{R \cdot T3}} \cdot p3 \cdot \psi(p22/p3)$$

is in this case a monotonously decreasing function to be applied, which is dependent on the geometry of the exhaust gas recirculation valve 110, and ∀ is a constant to be applied.

FIG. 3f shows an alternative exhaust gas recirculation quantity-calculation block 260. FIG. 3/1 shows a general exhaust gas recirculation quantity-calculation block 260, and FIG. 3/2 shows the same exhaust gas recirculation quantity-calculation block 260 for the special case of a closed throttle valve 40. In the general exhaust gas recirculation quantity-calculation block 260, the gas quantity recirculated per unit of time mEGR is calculated as the difference between the air charge per unit of time m22 and the fresh air mHFM flowing through the intake manifold 10: mEGR=m22−mHFM. In the special case of a closed throttle valve 40 illustrated in FIG. 3/2, the recirculated exhaust gas quantity mEGR is equal to the air charge per unit of time m22.

Figure 4:
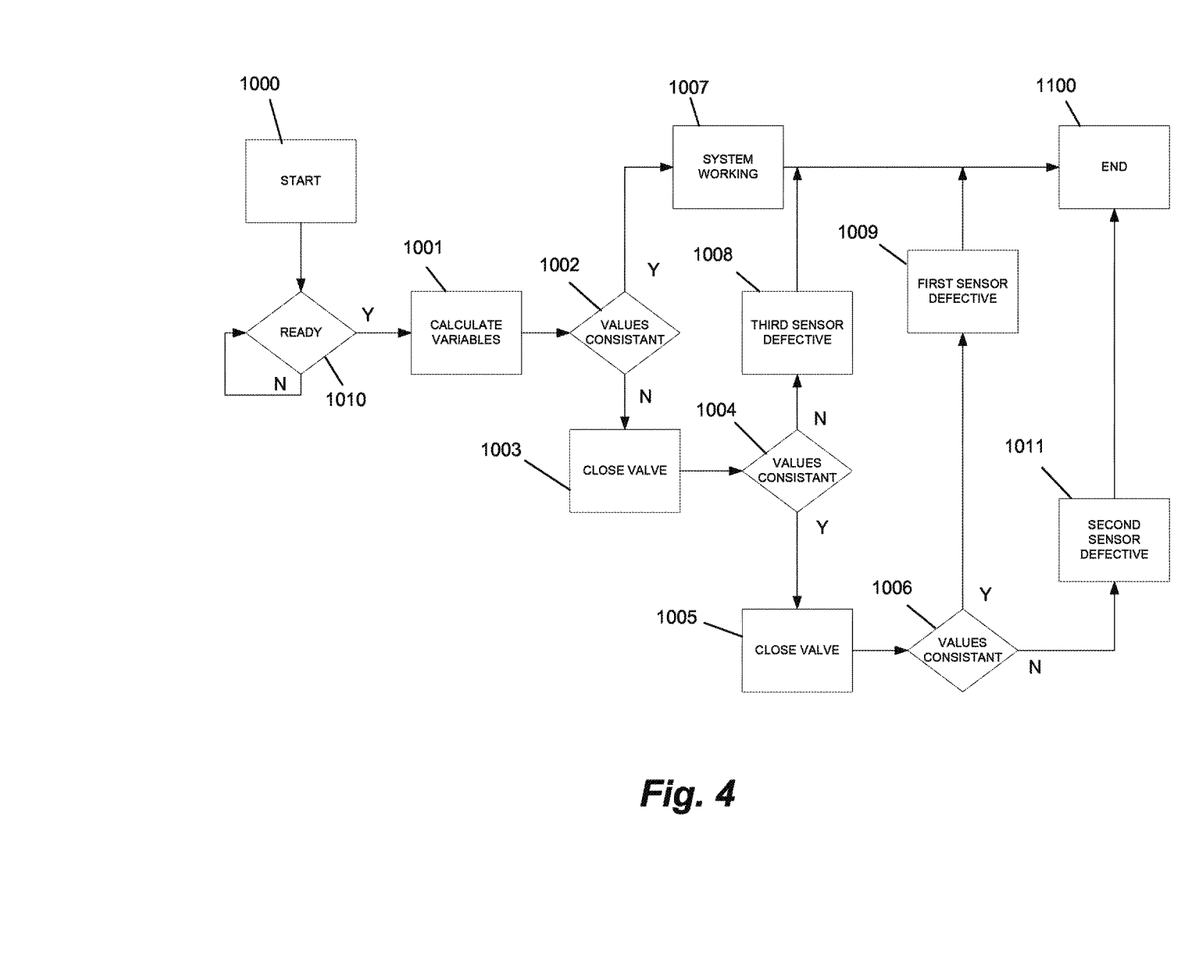
FIG. 4 shows the generic sequence of events of the diagnostic method.

FIG. 4 shows the generic sequence of events of the method according to the invention. By diagnosing, respectively detecting, a fault in the air mass flow meter 20, in the boost pressure sensor 150 or in the exhaust gas back pressure sensor 160, the method has the aim of keeping all three sensors in good working order. In this sense, said air mass flow meter 20, said boost pressure sensor 150 and said exhaust gas back pressure sensor 160 form a sensor system. In so doing, it is only of substantial importance for the method according to the invention that each of the three sensors characterizes the state of the gas system. Therefore, the description below relates only to a first sensor, a second sensor and a third sensor. The method begins with a starting step 1000, from which said method branches off to a next step 1010. A check is made in step 1010 to determine whether suitable conditions exist to carry out the method. If this is the case, said method branches off to an overall calculation step 1001. If this is not the case, step 1010 is repeated.

In the overall calculation step 1001, a comparison variable is calculated in two different ways. A first value of the comparison variable and a second value of the comparison variable are therefore calculated. The first value and the second value of the comparison variable are compared with each other in the subsequent fault detection step 1002. If it is determined in said fault detection step 1002 that the first value of the comparison variable, which was calculated in a first way, and the second value of the comparison variable, which was calculated in a second way, are not consistent with each other, it is thus established that a fault exists in the sensor system. It is therefore established that one of the sensors is faulty, the output values of which enter into a method of calculation of the comparison variable in the overall calculation step 1001 in such a way that the result of the comparison carried out in the fault detection step 1002 is a function of the output value of said comparison. A diagnosis can therefore be made as to whether the sensor system is working free from defects or not.

If it is determined in the fault detection step 1002 that the first value of the comparison variable and the second value of said comparison variable are consistent with each other, for example, because they are the same, the method decides that the sensor system is not defective and said method branches off to step 1007. An entry in a fault memory takes place, for example, in said step 1007. Step 1100 follows, with which the method is concluded.

If it is determined on the contrary in the fault detection step 1002 that the first value of the comparison variable and the second value of the comparison variable are not consistent with each other, for example, if their difference is greater than an allowed threshold value, the method further branches off to a second calculation step 1003, from which point a localization of the detected fault is carried out in the sensor system.

In the second calculation step 1003, the air system is divided into two branches by closing a valve or another existing means for the purpose of controlling a flow rate. This means that with the exception of an indirect gas flow across the combustion chamber 80, no direct gas flow takes place between a first region of the air system and a second region of said air system. A sensor, for example, the third sensor, is situated in the first region of said air system; and the other sensors, thus, for example, the first sensor and the second sensor, are situated in the second region of said air system. With the aid of two sensors of the sensor system, a second comparison variable is ascertained in two different ways. Consequently, a third value and a fourth value of the second comparison variable are ascertained. After ascertaining the third value and the fourth value of said second comparison variable, the valve or the other existing means is reopened for controlling the flow rate. The second calculation step 1003 can also be carried out without a valve or another existing means being closed for controlling a flow rate. In this case it should be noted that the third value and the fourth value of the second comparison variable are independent of the output value of the third sensor, or rather said output value of the third sensor admittedly influences said third value and said fourth value, but a comparison between said third value and said fourth value is, however, independent of said output value of the third sensor.

In the second fault detection step 1004 following the second calculation step 1003, the third value and the fourth value of the second comparison variable are compared with one another. If the values are consistent with each other, for example, because their difference is smaller than a second predefinable threshold value, the method recognizes thereupon that the first sensor and the second sensor of the sensor system are free from defects. Because the method detected in fault detection step 1002 that a sensor in the sensor system is defective, said method therefore recognizes that the third sensor of said sensor system is defective and follows up with step 1008, in which suitable counter measures can be introduced, e.g., by an entry being made into a fault memory. Step 1100 then follows, with which the method is concluded.

If, however, the method recognizes in the second fault detection step 1004 that the third and the fourth value are not consistent with each other, it is thereby concluded that a defect exists in the first sensor or in the second sensor. A third calculation step 1005 can follow in order to ensure a so-called "pin-pointing" of the defect detected in the fault detection step 1002.

In the third calculation step 1005, a second valve or another second means controlling a second air flow is closed. As a result, the air system is divided analogously to the second calculation step 1003 into two parts, namely a third region and a fourth region. The first sensor, for example, is situated in the third region, and, for example, the second and third sensors are situated accordingly in the fourth region. With the aid of two sensors, a third comparison variable is ascertained in two different ways. A fifth value and a sixth value of the third comparison variable are therefore ascertained as a function of the output signals of the second sensor and the third sensor. After ascertaining the fifth value and the sixth value of the third comparison variable, the second valve or the other second means controlling the second air flow is again opened.

Analogously to the second calculation step 1003, the calculation in the third calculation step 1005 can also take place such that the fifth value and the sixth value of the third comparison variable are independent of the output value of the first sensor without the second valve or the other second means controlling the second air flow being closed and then reopened after completion of the calculation. It is only essential that a comparison between said fifth value and said sixth value be independent of the output value of the first sensor.

A third fault detection step 1006 follows the third calculation step 1005. In this step, the fifth value and the sixth value of the third comparison variable are compared with one another. If the values are consistent with each other, for example, because their difference is smaller that a third predefinable threshold value, the method recognizes thereupon that the second and the third sensor are free from defects. The first sensor is therefore recognized as being defective. In this case, step 1009 follows, in which, for example, an entry into a fault memory occurs. After step 1009, the method further branches off to step 1100, with which said method is concluded.

On the other hand, if the method has recognized the fifth value and the sixth value not to be consistent with each other in the third detection step 1006, the second or the third sensor is thereby recognized to be defective. Because in the second detection step 1004, the method recognized the first sensor or the second sensor to be defective, said method now therefore recognizes the second sensor to be defective in the third detection step 1006. Step 1011 follows, in which for example an entry is made into a fault memory. Step 1011 is followed by step 1100, with which said method is concluded.

FIG. 5 shows two exemplary embodiments for carrying out the overall calculation step 1001 according to the invention and the fault detection step 1002. In the exemplary embodiments, the first, second and third sensor of the sensor system are represented by the air mass flow meter 20 acquiring the air quantity mHFM, the boost pressure meter 150 acquiring the boost pressure p22 and the exhaust gas back pressure sensor 160 acquiring the exhaust gas back pressure p3.

Figure 5A:
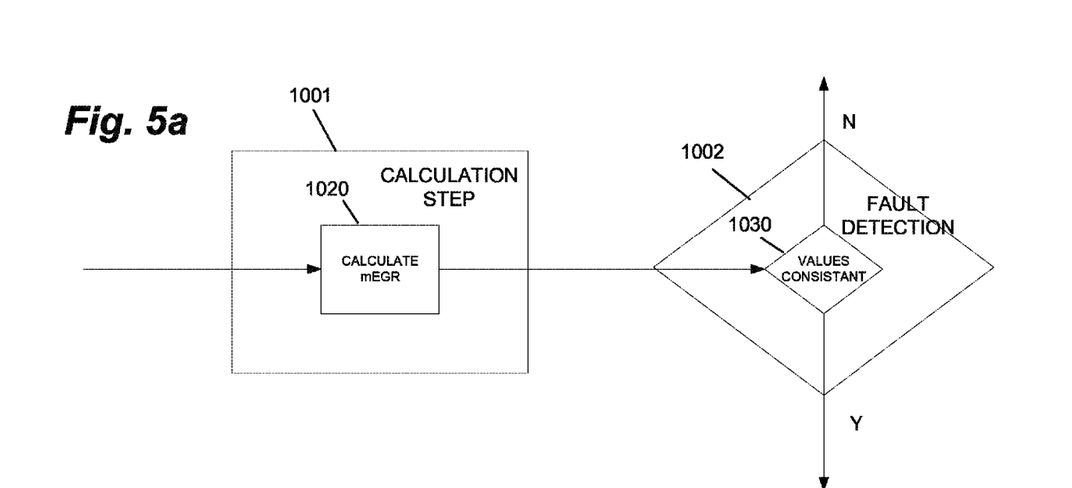
FIG. 5 shows exemplary embodiments for checking the plausibility of the sensor system.

FIG. 5a shows a first exemplary embodiment. In this case, the overall calculation step 1001 comprises an exhaust gas recirculation calculation step 1020, in which as depicted in FIG. 3e or in FIG. 3f the exhaust quantity recirculated per unit of time mEGR is shown to be calculated in two different ways. The first comparison variable therefore corresponds to the recirculated exhaust gas quantity mEGR, the first value corresponding to the calculation value for the recirculated exhaust gas quantity mEGR as depicted in FIG. 3e and the second value corresponding to the calculation value for the recirculated exhaust gas quantity mEGR as depicted in FIG. 3f.

The fault detection step 1002 comprises an exhaust gas recirculation fault detection step 1030, wherein the first value and the second value are compared with each other. As a function of this comparison, the method decides whether both values are consistent with each other or not. For example, said method examines the difference between said first and said second value of the recirculated exhaust gas quantity and thereupon decides that these values are consistent with each other if their difference is smaller than a threshold value.

Figure 5B:
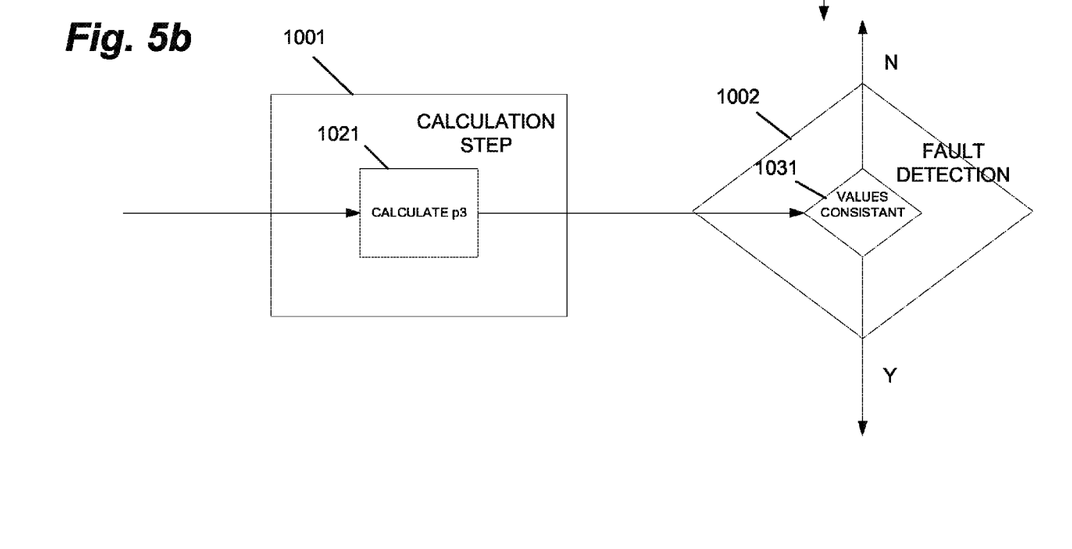

FIG. 5b shows a second exemplary embodiment. In this case, the overall calculation step 1001 comprises an exhaust gas back pressure calculation step 1021, wherein the exhaust gas back pressure p3 is shown to be ascertained in two different ways, i.e. as in FIG. 3c or directly via the output signal of the exhaust gas back pressure sensor 160. The first comparison variable therefore corresponds to said exhaust gas back pressure p3, the first value corresponding to the calculated value of said exhaust gas back pressure p3 as depicted in FIG. 3c and the second value corresponding to said exhaust back pressure p3 ascertained directly via the output signal of the exhaust gas back pressure sensor 160.

The fault detection step 1002 comprises an exhaust gas back pressure detection step 1031, wherein the first value and the second value are compared with each other. As a function of this comparison, the method decides whether the two values are consistent with each other or not. For example, said method examines the difference between said first and said second ascertained value of the exhaust gas back pressure and thereupon decides that these values are consistent with each other if their difference is smaller than a threshold value.

FIG. 6 shows three different exemplary embodiments for carrying out the second calculation step 1003 and the second fault detection step 1004 or the third calculation step 1005 and the third fault detection step 1006. Said second calculation step 1003 and said second fault detection step 1004 can be interchanged with the third calculation step 1005 and respectively the third fault detection step 1006.

Figure 6A:
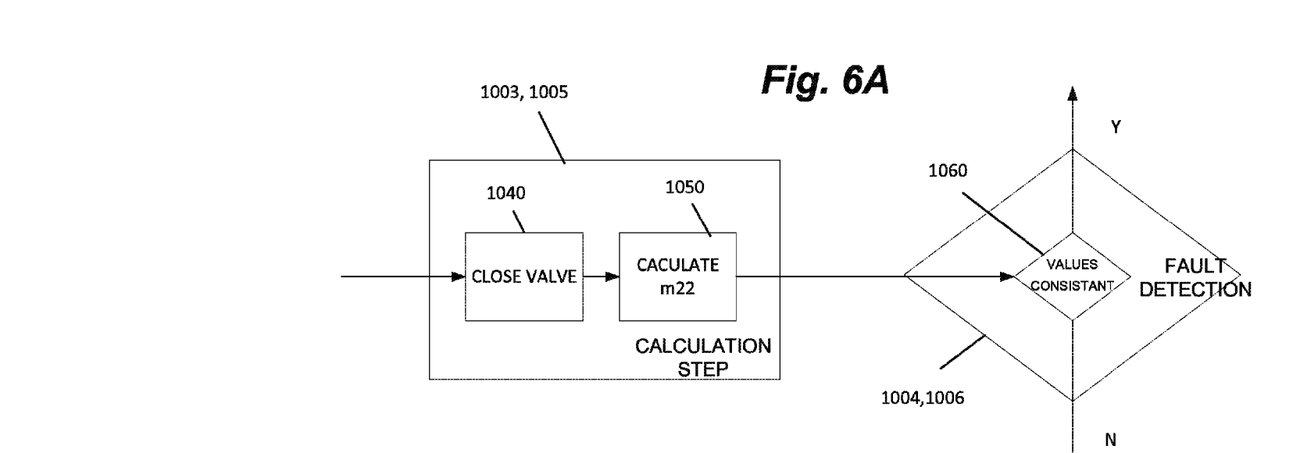
FIG. 6 shows exemplary embodiments for checking two sensors with each other for plausibility.

FIG. 6a shows a first exemplary embodiment. In this case, the second calculation step 1003 or the third calculation step 1005 comprises a step 1040, wherein the exhaust gas recirculation valve 110 is closed. The sensor system is thereby subdivided into a first region, in which the exhaust gas back pressure sensor 160 is situated, and into a second region, in which the air mass flow meter 20 and the boost pressure sensor 150 are situated. The step 1040 is also referred to as the separation step or as the case may be the second separation step, depending on whether said step is used in the second calculation step 1004 or in the third calculation step 1006.

Step 1050 follows step 1040. The second calculation step 1003 or the third calculation step 1005 comprises said step 1050. In step 1050 a first value of the air charge per unit of time m22 is calculated as depicted in FIG. 3a. The air charge m22 then corresponds in this instance to the second or third comparison variable. Because the exhaust gas recirculation valve 110 is closed, the flow across the air mass flow meter 20 is equal to said air charge per unit of time m22. The value of the air quantity mHFM ascertained from the output signal of said air mass flow meter 20 is therefore taken as the second value of the air charge per unit of time m22.

The second fault detection step 1004 or the third fault detection step 1006 comprises an air mass fault detection step 1030, wherein the first value of the air charge m22 is compared with the second value of the air charge m22. If the two values are not consistent, for example because their difference is greater than a predefinable threshold value, the method thereupon decides that either the air mass flow meter 20 or the boost pressure sensor 150 is defective. If on the other hand the two values are consistent, the method thereupon decides that the air mass flow meter 20 as well as the boost pressure sensor 150 is in good working order.

Figure 6B:
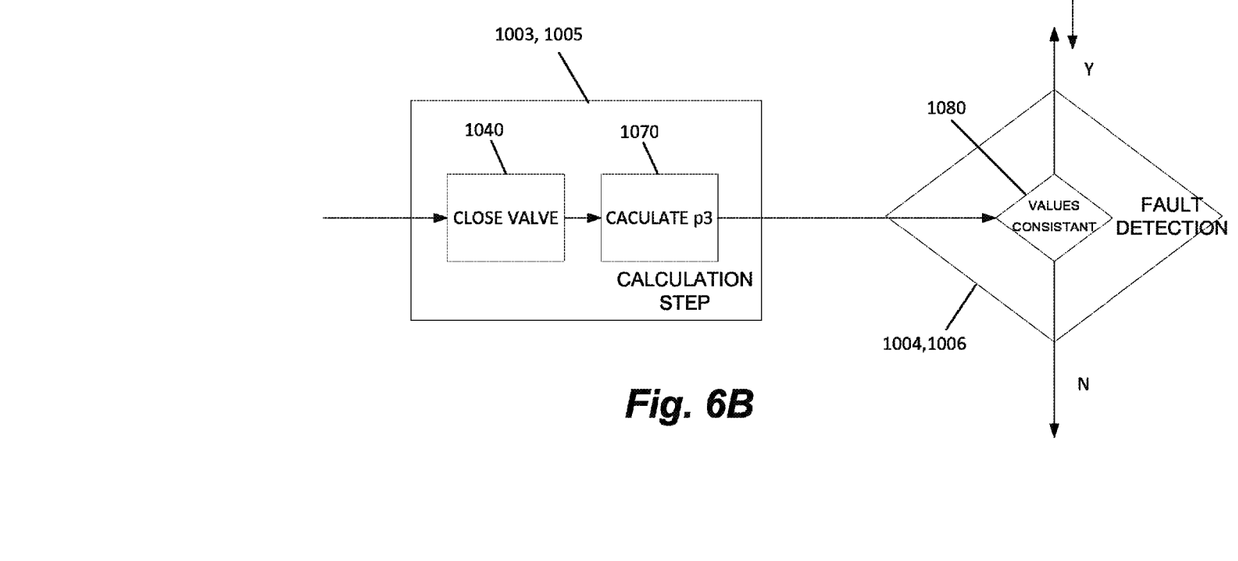

FIG. 6b shows a second exemplary embodiment. The second calculation step 1003 or the third calculation step 1005 comprises in this instance once again a step 1040, wherein the exhaust gas recirculation valve is closed, whereby the sensor system is thus divided up into a first region, in which the exhaust gas back pressure sensor 160 is situated, and a second region, in which the air mass flow meter 20 and the boost pressure sensor 150 are situated. Step 1040 is also in this case referred to as the separation step or as the case may be the second separation step, depending on whether said step is used in the second calculation step 1004 or in the third calculation step 1006.

The second calculation step 1003 or the third calculation step 1005 also comprises a step 1070 following step 1040, in which the exhaust gas back pressure p3 is calculated in two different ways. Firstly, said exhaust gas back pressure p3, which therefore corresponds to the second or third comparison variable, is directly ascertained from the exhaust gas back pressure sensor 160. Secondly, the air mass mHFM, which flows across the air mass flow meter 20, is equal to the air charge m22. Said air charge m22 is in turn ascertained as depicted in FIG. 3a. As depicted in FIG. 3b, the rotational speed nL of the exhaust gas turbocharger 30 is ascertained from the air mass mHFM flowing across said air mass flow meter 20, which is set equal to said air charge m22, and thereafter the exhaust gas back pressure p3 is calculated from said rotational speed nL as depicted in FIG. 3c. Said exhaust gas back pressure p3 is therefore ascertained without using the output signal of said air mass flow meter 20. Also in systems without exhaust gas turbochargers, said exhaust gas back pressure p3 is ascertained without using the output signal of said air mass flow meter 20.

The second fault detection step 1004 or the third fault detection step 1006 comprises an exhaust gas back pressure fault detection step 1080, wherein the first value of the exhaust gas back pressure p3 is compared with the second value of said exhaust gas back pressure p3. If the two values are not consistent, for example because their difference is greater than a predefinable threshold value, the method thereupon decides that either the boost pressure sensor 150 or the exhaust gas back pressure sensor 160 is defective. If on the other hand the two values are consistent with each other, said method thereupon decides that said boost pressure sensor 150 as well as said exhaust gas back pressure sensor 160 is in good working order.

As an alternative, the exhaust gas back pressure p3 can also be ascertained in step 1070 in the first way without using the output signal of the boost pressure sensor 150. As depicted in FIG. 3b, the rotational speed nL of the exhaust gas turbocharger 30 is in this case ascertained from the output signal of the air mass flow meter 20. The air charge m22 is set equal to the air quantity mHFM flowing across said air mass flow meter 20. As depicted in FIG. 3c, the exhaust gas back pressure p3 can thus be ascertained from the output signal of said air mass flow meter 20 with the aid of further signals but without the use of the output signal of said boost pressure sensor 150. As depicted in FIG. 3d, said exhaust gas back pressure p3 can be ascertained without using the output signal of said boost pressure sensor 150 in systems without an exhaust gas turbocharger. This is done by using the air quantity mHFM flowing across said air mass flow meter 20 instead of the air charge m22. Said exhaust gas back pressure p3 is ascertained in a second way directly from the signal of the exhaust gas back pressure sensor 160.

In the exhaust gas back pressure fault detection step 1080, the method thus decides when ascertaining the exhaust gas back pressure p3 without using the output signal of the boost pressure sensor 150 that the air mass flow meter 20 as well as the exhaust gas back pressure sensor 160 are in good working order if said method determines the two values to be consistent on the basis of the comparison between said exhaust gas back pressure p3 ascertained in the first way without using the output signal of said boost pressure sensor 150 and said exhaust gas back pressure p3 ascertained in the second way directly from the output signal of said exhaust gas back pressure sensor, for example, as a result of their difference not being greater than a predefinable threshold value. If, on the other hand, the two values are not consistent, the method decides that either said exhaust gas back pressure sensor 160 or said air mass flow meter 20 is defective.

Figure 6C:
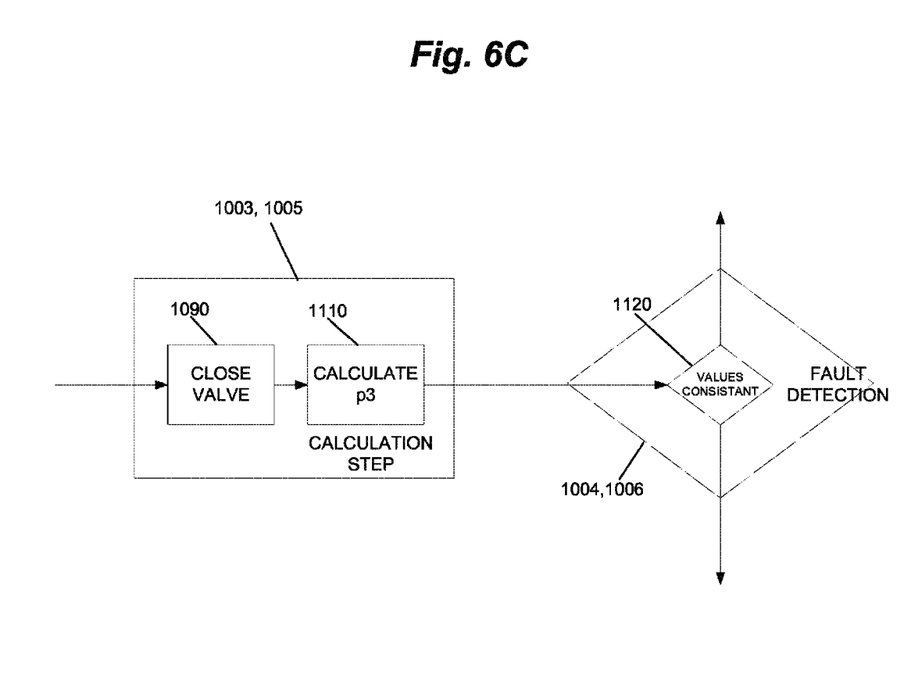

FIG. 6c shows a third exemplary embodiment. In this case, the second calculation step 1003 or the third calculation step 1005 comprises step 1090, wherein the throttle valve 40 is closed. The method can thereby only be carried out in the overrun mode. If the throttle valve is closed, the air mass mEGR flowing across the exhaust gas recirculation valve is calculated in two different ways. The second or third comparison variable is therefore given by the air mass recirculated per unit of time mEGR. The first value is calculated as depicted in FIG. 3e, the second value as depicted in FIG. 3f2. The step 1090 is also referred to as the separation step or as the case may be the second separation step, depending on whether said step 1090 is used in the second calculation step 1004 or in the third calculation step 1006.

The second fault detection step 1004 or the third fault detection step 1006 comprises a step 1090, wherein the first value of the recirculated exhaust air mass mEGR is compared with the second value of said recirculated exhaust air mass mEGR. If the two values are not consistent with each other, for example because their difference is greater than a predefinable threshold value, the method thereupon decides that either the boost pressure sensor 150 or the exhaust gas back pressure sensor 160 is defective. On the other hand, if both values are consistent with each other, said method thus decides thereupon that said boost pressure sensor 150 as well as said exhaust gas back pressure sensor 160 is in good working order.

Figure 7:
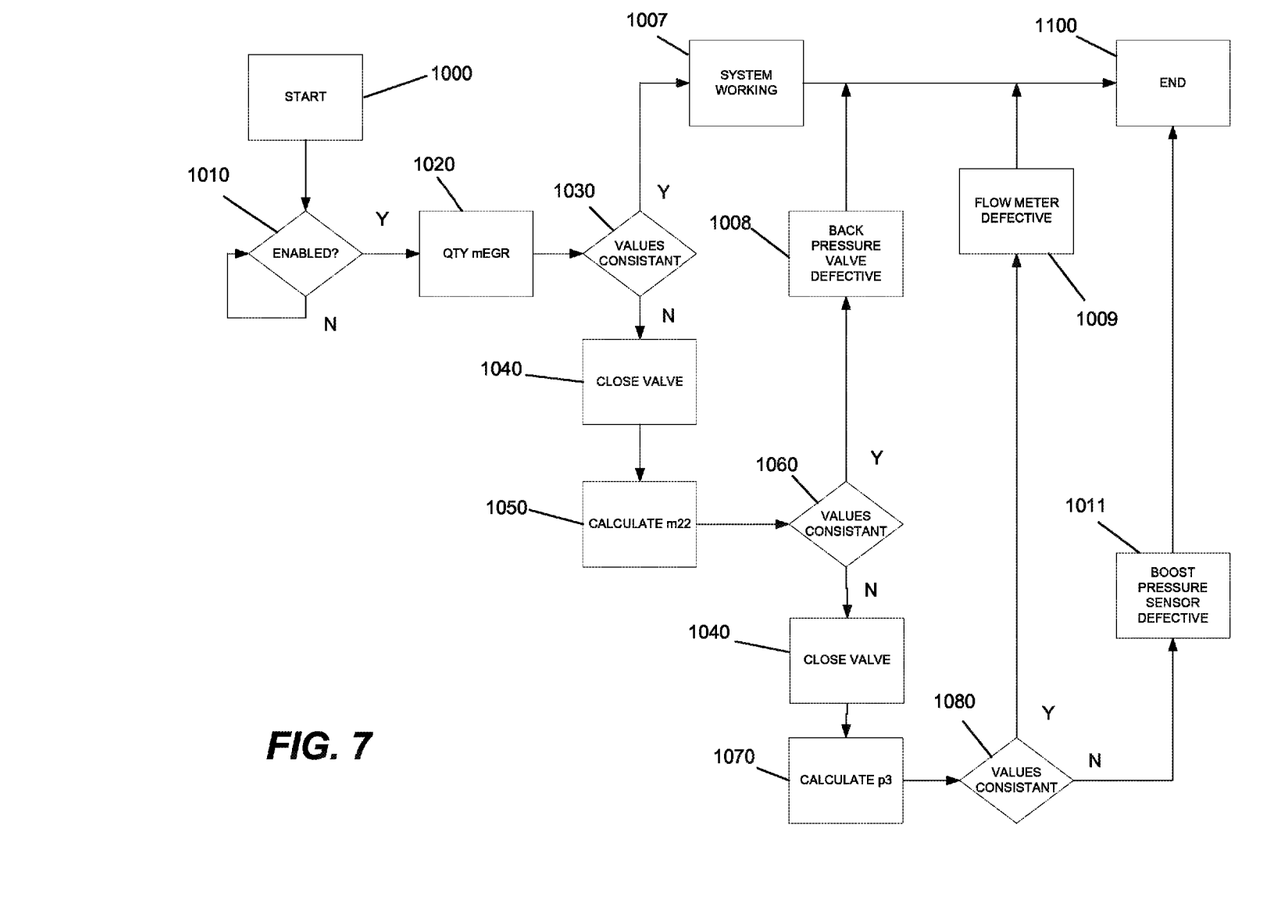
FIG. 7 shows a first exemplary embodiment for the sequence of events of the diagnostic method.

FIG. 7 shows a first exemplary embodiment of the invention. The method starts in step 1000. In the following step 1010, it is determined whether an implementation of said method according to the invention has been enabled. A check is performed, for example, if suitable operating conditions are present. If this is the case, step 1020 follows.

In step 1020, a first value and a second value for the quantity mEGR of the gas recirculated across the exhaust gas recirculation valve 110 are ascertained in the manner described in FIG. 5a. Step 1030 follows, wherein the method ascertains whether the two values are inconsistent with each other. If they are not, step 1007 follows, wherein it is determined that the sensor system consisting of the exhaust gas back pressure sensor 160, the boost pressure sensor 150 and the air mass flow meter 20 is in good working order, i.e. that all three sensors are in good working order. Step 1100 then follows, with which the method is concluded. If the two values are consistent with each other, step 1040 then follows.

In step 1040, the exhaust gas recirculation valve 110 is closed and step 1050 follows. In step 1050, the air charge m22 is calculated in two different ways as depicted in FIG. 6a. After the calculation has been completed, the exhaust gas recirculation valve 110 is reopened. Step 1060 follows, wherein a check is performed as to whether the value for the air charge m22 calculated in the first way is inconsistent with the value calculated in the second way. If it is not, step 1008 follows, wherein it is determined that the air mass flow meter 20 and the exhaust gas back pressure sensor 150 are in good working order and that the exhaust gas back pressure valve is therefore defective. If the two values are inconsistent with each other, step 1040 takes place again, wherein the exhaust gas recirculation valve is closed and the method proceeds with step 1070.

In step 1070, the exhaust gas back pressure p3 is calculated in two different ways as depicted in FIG. 6b. On the one hand, said exhaust gas back pressure p3 is ascertained directly from the output signal of the exhaust gas back pressure sensor 160, on the other hand from the output signal of the boost pressure sensor 150 without using the output signal of the air mass flow meter 20. Afterwards the exhaust gas recirculation valve 110 is reopened and step 1080 follows in the sequence of events.

A check is performed in step 1080 to determine whether the two values for the exhaust gas back pressure p3, which were calculated in different ways, are inconsistent with each other. If they are not, step 1009 follows, wherein it is determined that the boost pressure sensor 150 and the exhaust gas back pressure sensor 160 are in good working order and that the air mass flow meter 20 is not in good working order. Step 1100 subsequently follows in the sequence of events, with which the method is concluded. If in step 1080 said method determines the two values for said exhaust gas back pressure p3, which were calculated in different ways, to be inconsistent with each other, step 1011 follows, wherein it is determined that the boost pressure sensor 150 is defective and that the exhaust gas back pressure sensor 160 and the air mass flow meter 20 are in good working order. Step 1100 then follows, with which the method is concluded.

Figure 8:
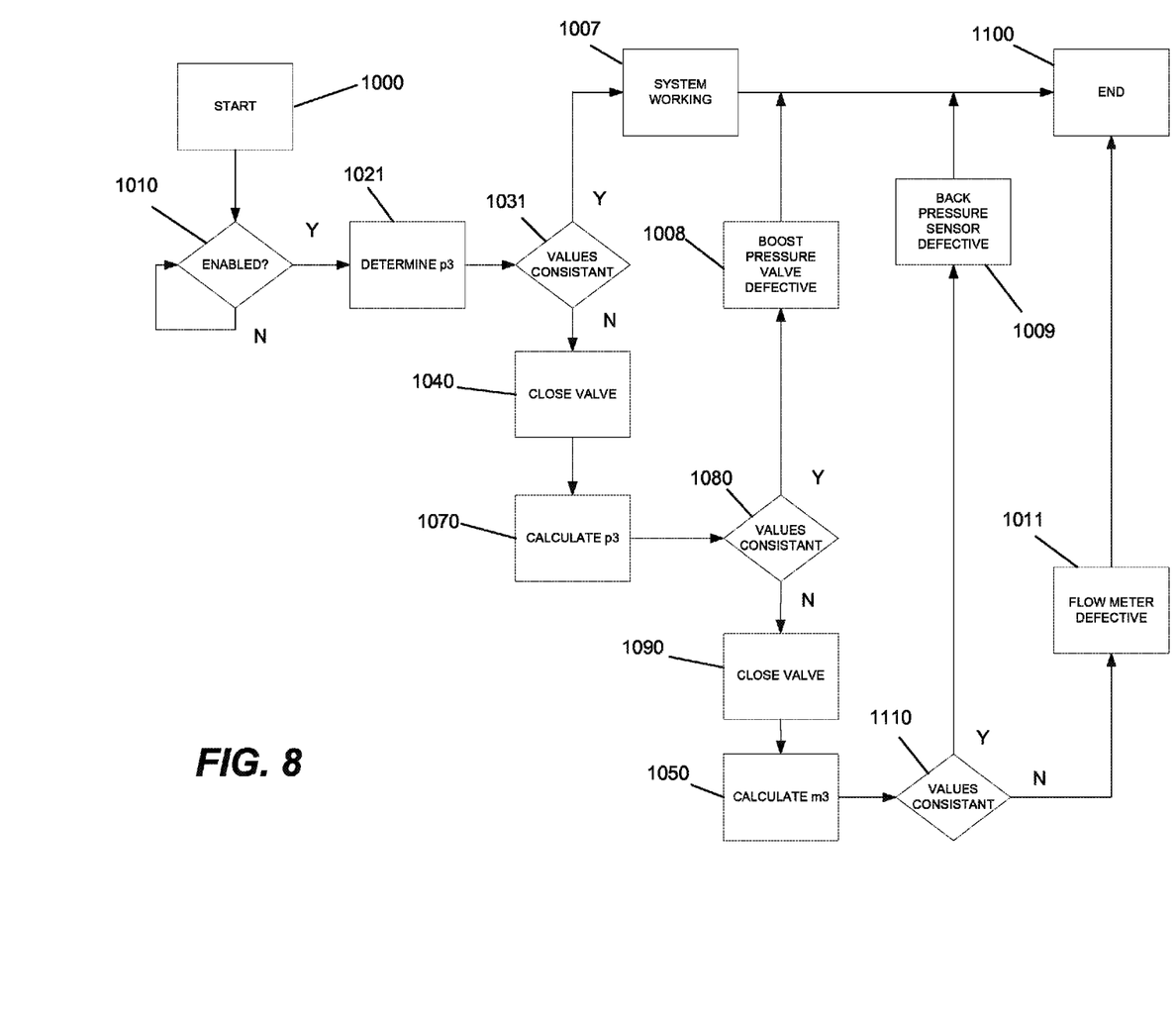
FIG. 8 shows a second exemplary embodiment for the sequence of events of the diagnostic method.

FIG. 8 shows a second exemplary embodiment. In place of step 1020, step 1021 is introduced. In this step as depicted in FIG. 5b, the exhaust gas back pressure p3 is ascertained as a function of the output signals of the boost pressure sensor 150, the exhaust gas back pressure sensor 160 and the air mass flow sensor 20. Accordingly step 1031 follows step 1020 in place of step 1030.

If the method in step 1031 detects that an inconsistency in the calculated values exists, a diagnosis performed in step 1007 like that in the first exemplary embodiment determines the sensor system to be in good working order, and step 1100 follows, with which the method is concluded.

If on the other hand the method detects that an inconsistency between the two calculated values of the exhaust gas back pressure p3 exists, step 1040 follows, wherein the exhaust gas recirculation valve 110 is closed and the method proceeds with step 1070, wherein said exhaust gas back pressure p3 is calculated in two different ways as described with regard to FIG. 6b. Exactly like in the first exemplary embodiment, said exhaust gas back pressure p3 is determined in this instance in the first way, i.e. directly from the output signal of the exhaust gas back pressure sensor 160. Unlike the process in the first exemplary embodiment, the signal of the boost pressure sensor 150 is not used during the second determination of said exhaust gas back pressure p3 but instead the signal of the air mass flow meter 20. The exhaust gas recirculation valve 110 is subsequently reopened. If thereupon the method recognizes in the following step that the two ascertained values of said exhaust gas back pressure p3 are not inconsistent with each other, said method determines in Step 1008 the exhaust gas back pressure sensor 160 and the air mass flow meter to be in good working order and the boost pressure sensor 150 to be defective. Step 1100 follows in the sequence of events, with which said method is concluded.

If on the other hand it is recognized in step 1080 that the two values are not consistent with each other, step 1040 follows as illustrated in FIG. 6*a*, wherein the exhaust gas recirculation valve is closed. Step 1050 then follows in the sequence of events, wherein the air charge m22 is determined, as described with regard to FIG. 6*a*, in two different ways as a function of the output signals of the air mass flow meter 20 and the boost pressure sensor 150 but independently of the output signal of the exhaust gas back pressure sensor 160. If the two values are not inconsistent with each other, step 1009 follows, wherein the method determines the boost pressure sensor 150 and the air mass flow meter 20 to be in good working order and therefore the exhaust gas back pressure sensor 160 to be defective. If the two values are inconsistent with each other, step 1011 follows in the sequence of events, wherein said method determines said exhaust gas back pressure sensor 160 and said boost pressure sensor 150 to be in good working order and therefore said air mass flow meter 20 to be defective. Step 1100, with which said method is concluded, follows step 1009 or as the case may be step 1011.

Figure 9:
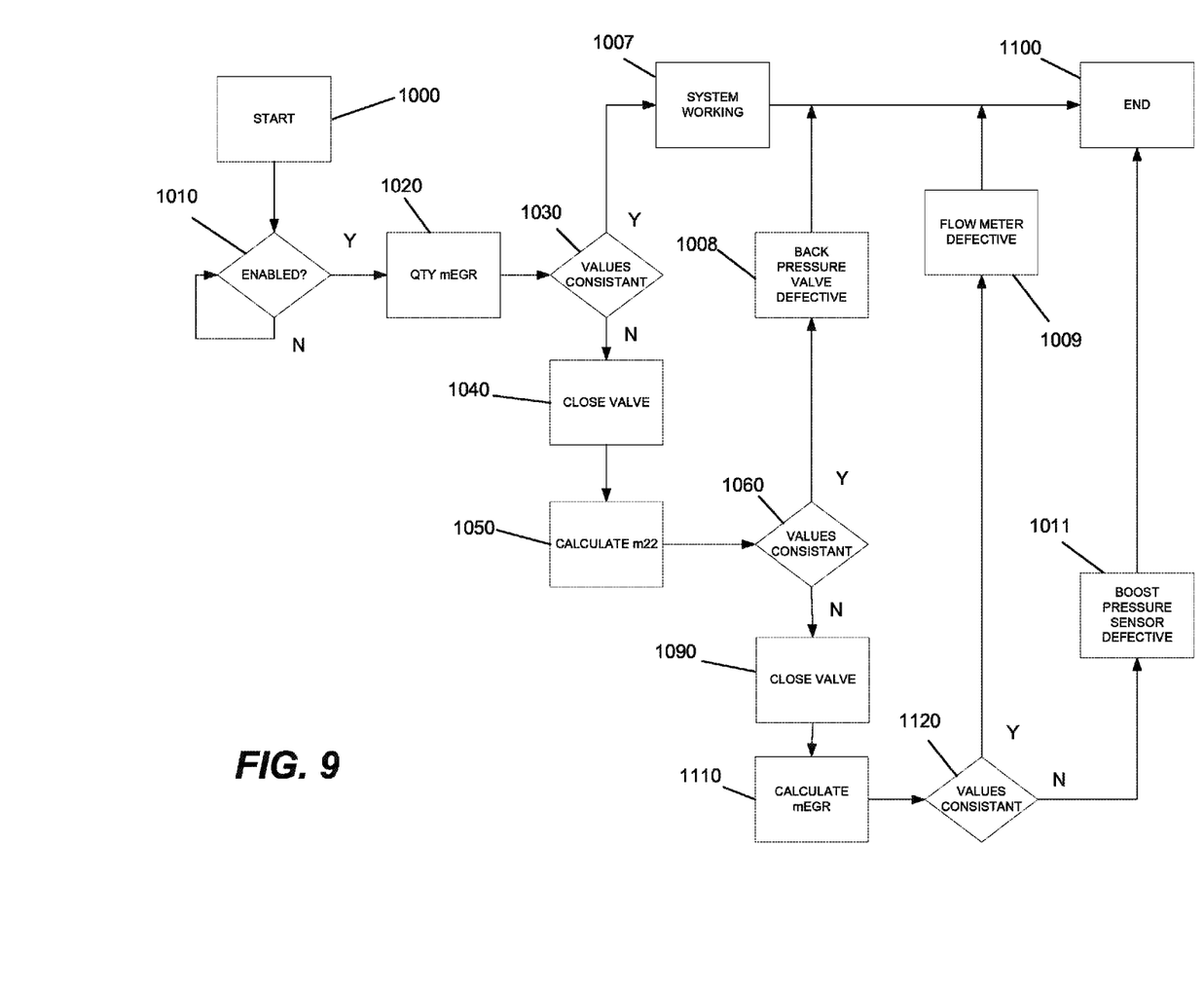
FIG. 9 shows a third exemplary embodiment for the sequence of events of the diagnostic method.

FIG. 9 shows a third example of fault detection. As in the first exemplary embodiment, a calculation of the mass flow mEGR across the exhaust gas recirculation valve 110 follows step 1010; and in step 1030, the method subsequently decides whether an inconsistency exists between the two calculated values for the mass flow mEGR. If no inconsistency is present, said method decides in step 1007 just as in the first example of fault detection that the sensor system is in good working order and the method is concluded in the following step 1100.

If an inconsistency exists, the exhaust gas recirculation valve 110 is closed in step 1040; and as illustrated in FIG. 6*a* or in FIG. 8, the method decides in steps 1050 and 1060 on the basis of two calculations for the air charge m22 if an inconsistency between said calculations for the air charges exists. If an inconsistency does not exist, step 1008 follows, wherein said method determines the air mass flow meter 20 and the boost pressure sensor 150 to be in good working order and therefore for a defect to be present in the exhaust gas back pressure sensor 160. Step 1100 follows thereafter, with which said method is concluded.

If an inconsistency exists, the method branches off to step 1090, wherein the throttle valve 40 is closed as depicted in FIG. 6*c*. As previously described, this occurs, for example, in the overrun mode of the internal combustion engine. In step 1110, the mass flow mEGR across the exhaust gas recirculation valve 110 is calculated in two different ways as illustrated in FIG. 6*c*. The two values of the mass flow mEGR are a function of the output values of the boost pressure sensor 150 and the exhaust gas back pressure sensor 160 but independent of the output value of the air mass flow meter 20. After the calculation has been completed, the throttle valve 40 can be reopened. Step 1120 follows in the sequence of events, wherein the method decides whether the two ascertained values are inconsistent with each other. If this is not the case, the method determines said boost pressure sensor 150 and said exhaust gas back pressure sensor 160 to be in good working order in step 1009 and therefore said air mass flow meter 20 to be defective. If the method decides in step 1120 that the two values for the recirculated gas quantity mEGR, which were ascertained in step 1110, are inconsistent with each other, step 1011 follows, wherein said method determines the air mass flow meter 20 and the exhaust gas back pressure sensor 160 to be in good working order and the boost pressure sensor 150 to therefore be defective. Step 1100, with which said method is concluded, follows step 1009 or as the case may be step 1011.

Beyond these three exemplary embodiments, further combinations of the test procedures depicted in FIG. 5 and FIG. 6 are possible in the generic method illustrated in FIG. 4. Provided that only a partial breakdown of a defect is necessary, the method illustrated in FIG. 4 can also be concluded prior to the third calculation step 1005 or also prior to the second calculation step 1003. Should more than three sensors be present in the sensor system to be diagnosed, it is, of course, possible to carry out further differential diagnostic steps after said third calculation step 1005 or said third fault detection step 1006. In order, for example, to be able to diagnose yet a fourth sensor, it is necessary that the result of the comparison in the fault detection step 1002 be a function of an output signal of the fourth sensor and that in a fourth calculation step to be carried out, in the event an inconsistency was not determined in the third fault detection step 1006, a fourth calculated variable be calculated in two ways such that the result is from the output signal of said fourth sensor and from one or two but not from all of the sensors, which were previously classified as being in good working order. Further generalizations regarding a larger number of sensors of the sensor system are also possible.

The invention claimed is:

1. A method for diagnosing a malfunction of an air-state sensor system in an air system of an internal combustion engine, said sensor system comprising a first air state sensor, a second air state sensor and a third air state sensor, wherein a first value and a second value of a first comparison variable, which characterizes a state of the air system, are ascertained in two different ways in an overall calculation step (1001) such that the result of a comparison between the first value and the second value is a function of each of the output variables of the first, second and third air state sensors and wherein in a fault detection step (1002), said method determines as a function of the comparison between the first value and the second value of the first comparison variable that a fault exists in one of the first, second and third air state sensors of said air-state sensor system.

2. The method according to claim 1, characterized in that the first comparison variable is stated in terms of a mass flow (mEGR) across an exhaust gas recirculation valve (110).

3. The method according to claim 1, characterized in that the first comparison variable is stated in terms of an exhaust gas back pressure (p3).

4. The method according to claim 1, characterized in that
a third value and a fourth value of a second comparison variable, which characterizes the state of the air system, are ascertained in two different ways in a second calculation step (1003),
the result of a comparison between the third value and the fourth value is a function of the output variables of the first air state sensor and the second air state sensor and is independent of the output variable of the third air state sensor, and
in a second fault detection step (1004), a conclusion is drawn as a function of the comparison of the third value and the fourth value of the second comparison variable that the third air state sensor is defective.

5. The method according to claim 1, characterized in that a first means controlling a first air flow is actuated to close in a separation step (1040, 1090) and therefore divides the air system into a first region, in which two of the three air state sensors lie, and a second region, in which the remaining sensor of the three air state sensors lies; thus enabling the result of the comparison between the third value and the fourth value to be a function of the output variables of the first and second air state sensor and to be independent of the output variable of the third air state sensor.

6. The method according to claim 5, characterized in that the second comparison variable is stated in terms of a mass flow (mEGR) across an exhaust gas recirculation valve (110).

7. The method according to claim 5, characterized in that the second comparison variable is stated in terms of an exhaust gas back pressure (p3).

8. The method according to claim 5, characterized in that the second comparison variable is stated in terms of an air charge (m22) per unit of time to combustion chambers (80) of an internal combustion engine.

9. The method according to claim 1, characterized in that
a fifth and a sixth value of a third comparison variable, which characterizes the state of the air system, are ascertained in two different ways in a third calculation step (1005) such that the result of a comparison between the fifth and the sixth value is a function of the output variables of the second air state sensor and the third air state sensor and independent of the output variable of the first air state sensor, and
in a third fault detection step (1006), a conclusion is drawn as a function of the comparison of the fifth value and the sixth value of the third comparison variable that the first air state sensor is defective.

10. The method according to claim 9, characterized in that a second means controlling a second air flow is actuated to close in a second separation step (1040, 1090) and therefore divides the air system into a third region, in which two air state sensors lie, and a fourth region, in which the remaining sensor of the three air state sensors lies, thus enabling the result of the comparison between the fifth value and the sixth value to be a function of the output variables of the second and third air state sensor and to be independent of the output variable of the first air state sensor.

11. The method according to claim 9, characterized in that the third comparison value is stated in terms of a mass flow (mEGR) across an exhaust gas recirculation valve (110).

12. The method according to claim 9, characterized in that the third comparison value is stated in terms of an exhaust gas back pressure (p3).

13. The method according to claim 9, characterized in that the third comparison value is stated in terms of an air charge (m22) per unit of time to combustion chambers (80) of the internal combustion engine.

14. The method according to claim 1, characterized in that the first air state sensor, the second air state sensor and the third air state sensor correspond in each case to one of the following sensors:
an air mass flow meter
a boost pressure sensor
an exhaust gas back pressure sensor.

15. A computer program, characterized in that it is programmed for use in a method according to claim 1.

16. An electrical storage medium for a control and/or regulating device of an internal combustion engine, characterized in that a computer program for use in a method according to claim 1 is stored thereon.

17. A control and/or regulating device of an internal combustion engine, characterized in that said device is programmed for use in a method according to claim 1.

* * * * *